United States Patent [19]

Kanno

[11] Patent Number: 5,010,581
[45] Date of Patent: Apr. 23, 1991

[54] DATA PROCESSING APPARATUS HAVING FUNCTION FOR RETRIEVING ABSTRACT AND ORIGINAL IMAGE DATA

[75] Inventor: Masayuki Kanno, Fujisawa, Japan
[73] Assignee: Kabushiki Kaisha Toshiba, Kawasaki, Japan
[21] Appl. No.: 278,086
[22] Filed: Nov. 30, 1988
[30] Foreign Application Priority Data
Nov. 30, 1987 [JP] Japan ................................ 62-302685
[51] Int. Cl.$^5$ .............................................. G06K 9/00
[52] U.S. Cl. .................................. 382/56; 364/225.4; 364/253.2; 364/255.7; 364/955.3; 364/955.5
[58] Field of Search .................... 382/56; 364/900, 200
[56] References Cited

U.S. PATENT DOCUMENTS

| | | | |
|---|---|---|---|
| 3,810,174 | 5/1974 | Heard et al. | 343/5 DP |
| 4,468,755 | 8/1984 | Iida | 364/900 |
| 4,574,395 | 3/1986 | Kato | 382/56 |
| 4,602,333 | 7/1986 | Komori | 382/56 |
| 4,661,988 | 4/1987 | Shimizu | 382/65 |

*Primary Examiner*—David K. Moore
*Assistant Examiner*—Daniel Santos
*Attorney, Agent, or Firm*—Finnegan, Henderson, Farabow, Garrett, and Dunner

[57] ABSTRACT

A data processing apparatus for electronically filing image date including reduced image data is disclosed. An operator sets up a retrieval mode in the filing apparatus, and enters a retrieval code for retrieving desired image data. These operations are made by using related keys on keyboard. A CPU makes a predetermined check, and stores the document number specified by the checked retrieval code into main memory. The CPU reads out a retrieval code table from magnetic disk, and displays it on the display on CRT display device. The operator checks if there is present or absent the abstract image data of A4 resulting from the original large image data of A1 or A2 as the already registered each document number. In a retrieval mode, the abstract image is retrieved, and the intended image data is pointed out by keyboard. In response to this, CPU reads out the corresponding image data from optical disk. The read out image data is passed through CODEC and enlarge/reduction circuit, and is displayed by CRT display device, in the form of an image of A1.

24 Claims, 15 Drawing Sheets

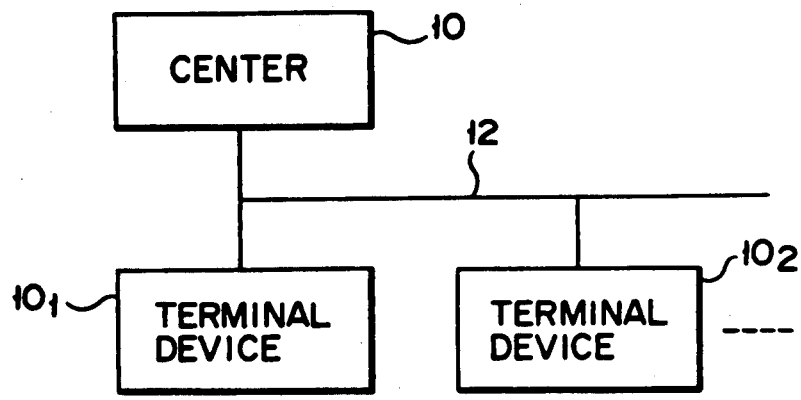
FIG. 1
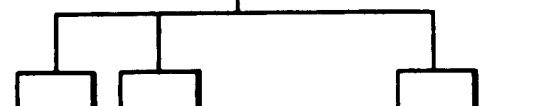
FIG. 5

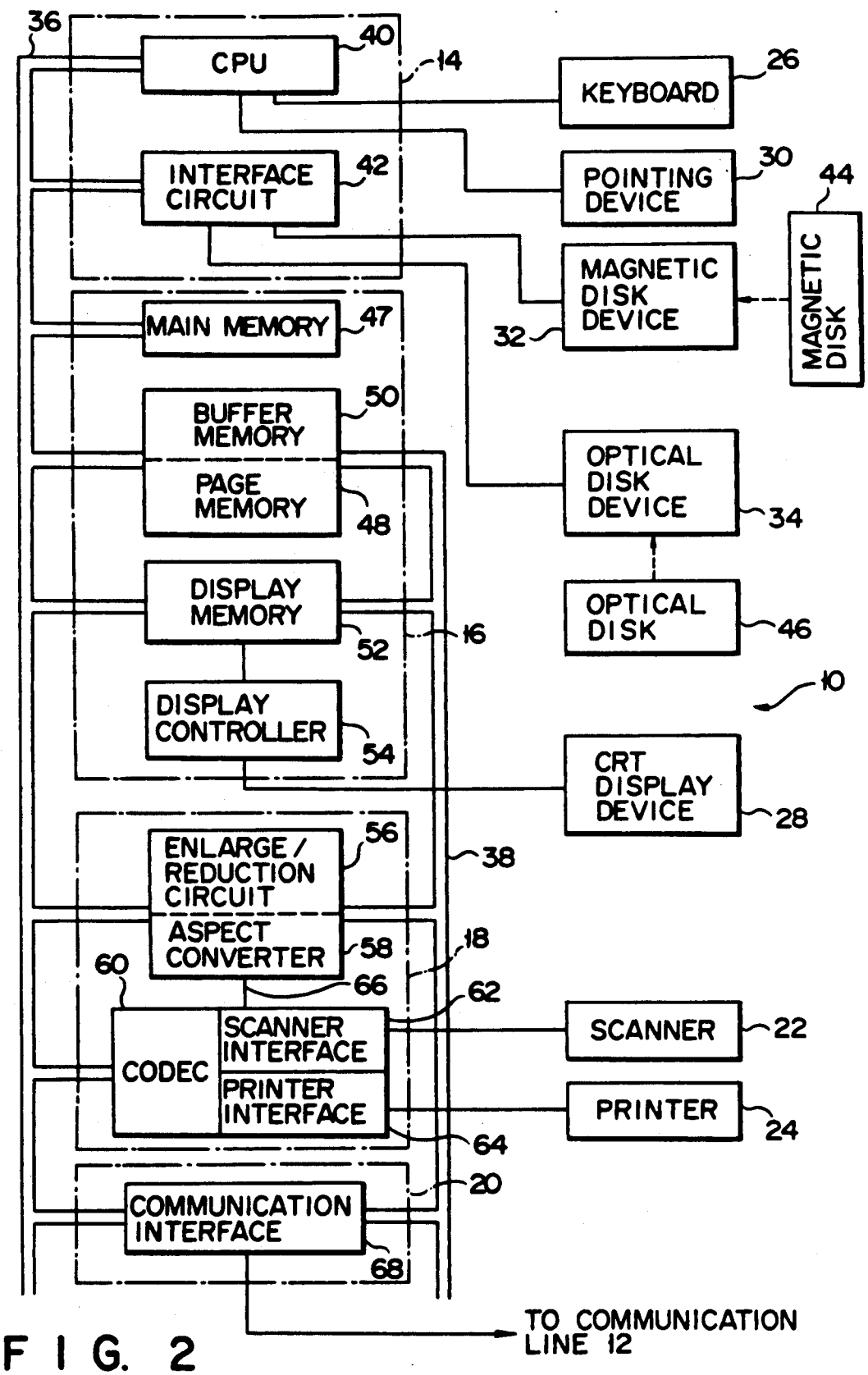
F I G. 2

FIG. 3

| IMAGE NO. | DOCU-MENT NO. | PAGE NO. | DOCU-MENT SIZE | COM-PRESSION METHOD | RESO-LUTION | BLOCK LENGTH | ADDRESS |
|---|---|---|---|---|---|---|---|
| 000001 | 000001 | A | A4 | MH | 200 | 10 | 100000 |
| 2 | | 1 | A1 | MH | 400 | 85 | 100010 |
| 3 | | 2 | A1 | MR | 400 | 78 | 100095 |
| 4 | | 3 | A1 | MR | 400 | 96 | 100173 |
| 000005 | 000002 | A | A4 | MR | 200 | 9 | 100269 |
| 6 | | 1 | A2 | MR | 400 | 41 | 100278 |
| 7 | | 2 | A2 | MR | 400 | 45 | 100319 |
| 000010 | 000003 | — | — | — | — | — | 100364 |
| 000011 | | 1 | A4 | MR | 200 | 8 | 100364 |
| 12 | | 2 | A4 | MR | 400 | 16 | 100372 |
| 13 | | 3 | A4 | MH | 8 | 10 | 100388 |
| 000014 | 000015 | A | A4 | MR | 200 | 12 | 100398 |
| 15 | | 1 | A1 | MR | 400 | 102 | 100410 |
| 16 | | 2 | A1 | MR | 200 | 46 | 100512 |
| 17 | | 3 | A2 | MR | 200 | 31 | 100558 |
| 18 | | 4 | A1 | MR | 400 | 89 | 100589 |
| 000109 | 000118 | — | — | — | — | — | 100678 |
| 110 | | 1 | A3 | MR | 400 | 50 | 100728 |
| 111 | | 2 | A4 | MR | 400 | 20 | 100778 |
| 000123 | 001001 | A | A4 | MR | 400 | 17 | 101000 |
| 124 | | 1 | A1 | MR | 400 | 153 | 101017 |
| 125 | | 2 | A1 | MR | 200 | 68 | 101170 |
| 000126 | 001002 | A | A4 | MR | 200 | 11 | 101238 |

| | | |
|---|---|---|
| BINDER : ISSUED BY | | NO. OF PAGES : 84 |
| CABINET : IMAGE FILE TECHNICAL MATERIAL | | REMAINDER : 58.4 % |

| NEW REGISTRATION | | NO. OF REGISTRATIONS : 0 |
|---|---|---|
| MULTI-TITLE | 1 | |
| NO. | KEY NAME | KEY VALUE (KANJI)(30 DIGITS)(VARIABLE) |
| 1 | MATERIAL NO. | NO. 12345 |
| 2 | CLASSIFICATION | CIRCUIT DIAGRAM |
| 3 | DATE | 870829 |
| 4 | TYPE | IMAGE FILE |
| 5 | TITLE | ABSTRACT IMAGE RETRIEVAL SYSTEM |
| 6 | | |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |
| TOTAL | 0 / | |

F I G. 7

| | | | | | | | | | |
|---|---|---|---|---|---|---|---|---|---|
| BINDER | : ISSUED BY | | | | NO. OF PAGES : 84 | | | | |
| CABINET | : IMAGE FILE TECHNICAL MATERIAL | | | | REMAINDER : 58.4 % | | | | |

| NEW REGISTRATION | | | | | | NO. OF REGISTRATIONS : 0 | | | |
|---|---|---|---|---|---|---|---|---|---|
| MULTI–TITLE | | 1 | | | | | | | |
| NO. | KEY NAME | KEY VALUE (KANJI)(30 DIGITS)(VARIABLE) | | | | | | | |
| 1 | MATERIAL NO. | NO. 12345 | | | | | | | |
| 2 | CLASSIFICATION | CIRCUIT DIAGRAM | | | | | | | |
| 3 | DATE | 870829 | | | | | | | |
| 4 | TYPE | IMAGE FILE | | | | | | | |
| 5 | TITLE | ABSTRACT IMAGE RETRIEVAL SYSTEM | | | | | | | |
| 6 | ABSTRACT IMAGE | YES | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | | | |
| | TOTAL | 0 / | | | | | | | |

FIG. 8

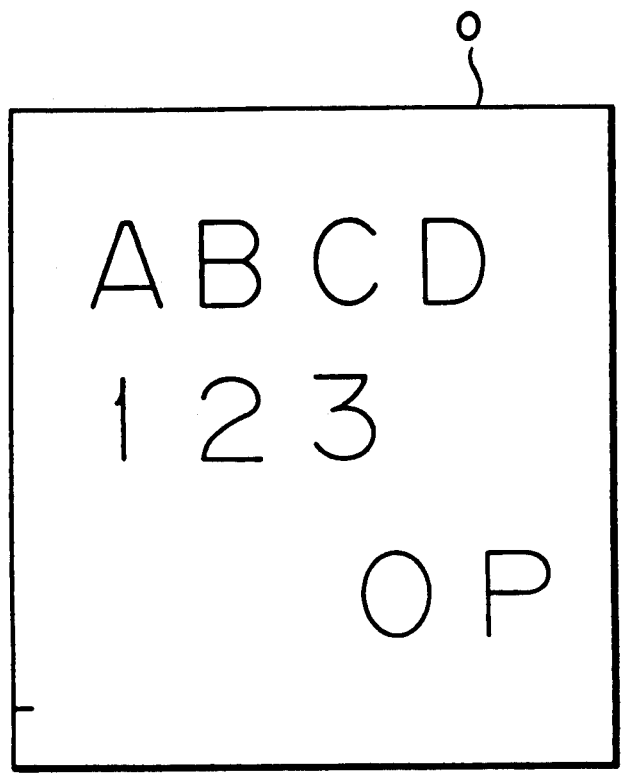
F I G. 9A
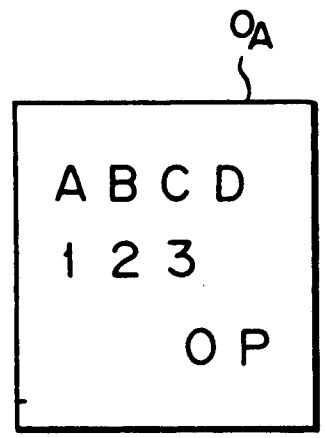
F I G. 9B

| BINDER : ISSUED BY | | | NO. OF PAGES : 84 |
|---|---|---|---|
| CABINET : ELECTRONIC FILE TECHNICAL MATERIAL | | | REMAINDER : 58.4 % |

| LIST OF CORRESPONDED TITLES | | | |
|---|---|---|---|
| | | | NO. OF TITLES : 84 |
| RETRIEVAL NO. | TOTAL PAGE | PROCESSED PAGE | |
| 1 | MATERIAL NO. | 6 | ABSTRACT IMAGE |
| 2 | CLASSIFICATION | | |
| 3 | DATE OF ISSUE | | |
| 4 | TYPE | | |
| 5 | TITLE | | |
| 1 | 43 | | |
| 1 | NO. 12345 | 6 | YES |
| 2 | CIRCUIT DIAGRAM | | |
| 3 | 861205 | | |
| 4 | IMAGE FILE | | |
| 5 | IMAGE FILE | | |
| 2 | 33 | | |
| 1 | NO. 12346 | 6 | NO |
| 2 | CIRCUIT DIAGRAM | | |
| 3 | 861129 | | |
| 4 | IMAGE FILE | | |
| 5 | CONTROLLER | | |
| 3 | 27 | | |
| 1 | NO. 42347 | 6 | YES |
| 2 | NEWS | | |
| 3 | 861113 | | |
| 4 | IMAGE FILE | | |
| 5 | TREND OF IMAGE FILE | | |

PICKED UP : WHAT DOCUMENT ? ■
          : WHAT PAGE ?    X
          : WHAT EDITION ?   X

CURRENT POINTER SETTINGS    1
(DOCUMENT, PAGE, REVISED EDITION)

| IMAGE NO. | DOCU-MENT NO. | PAGE NO. | DOCU-MENT SIZE | COM-PRESSION METHOD | RESO-LUTION | BLOCK LENGTH | ADDRESS | PRESENCE OF ABSTRACT IMAGE | IMAGE NO. |
|---|---|---|---|---|---|---|---|---|---|
| 000001 | 000001 | 1 | A1 | MH | 400 | 85 | 100000 | YES | 010001 |
| 2 | | 2 | A1 | MR | 400 | 78 | 100085 | NO | |
| 3 | | 3 | A1 | MR | 400 | 96 | 100162 | NO | |
| 4 | 000002 | 1 | A2 | MR | 400 | 41 | 100278 | YES | 010002 |
| 5 | | 2 | A2 | MR | 400 | 45 | 100319 | NO | |
| 6 | 000003 | 1 | A4 | MR | 200 | 8 | 100364 | NO | |
| 7 | | 2 | A4 | MR | 400 | 16 | 100372 | NO | |
| 8 | | 3 | A4 | MH | 8 | 10 | 100388 | NO | |
| 9 | 000004 | 1 | A1 | MR | 400 | 102 | 100400 | YES | 010003 |
| 10 | | 2 | A1 | MR | 200 | 46 | 100502 | NO | |
| 11 | | 3 | A2 | MR | 200 | 31 | 100548 | NO | |
| 12 | | 4 | A1 | MR | 400 | 89 | 100579 | NO | |
| 13 | 000005 | 1 | A3 | MR | 400 | 50 | 100728 | NO | |
| 14 | | 2 | A4 | MR | 400 | 20 | 100778 | NO | |
| 15 | 000006 | 1 | A1 | MR | 400 | 153 | 101017 | YES | 010004 |
| 16 | | 2 | A1 | MR | 200 | 68 | 101170 | NO | |

F I G. 13B

| IMAGE NO. | DOCU-MENT NO. | PAGE NO. | DOCU-MENT SIZE | COM-PRESSION METHOD | RESO-LUTION | BLOCK LENGTH | ADDRESS |
|---|---|---|---|---|---|---|---|
| 010001 | 0000001 | 0 | A4 | MH | 200 | 10 | 110000 |
| 010002 | 0000002 | 0 | A4 | MR | 200 | 9 | 110010 |
| 010003 | 0000004 | 0 | A4 | MR | 200 | 12 | 110019 |
| 010004 | 0000006 | 0 | A4 | MR | 200 | 17 | 110031 |

44

DATA PROCESSING APPARATUS HAVING FUNCTION FOR RETRIEVING ABSTRACT AND ORIGINAL IMAGE DATA

BACKGROUND OF THE INVENTION

1. Field of the Invention

This invention relates to a data processing apparatus and, more particularly, to a data processing apparatus having function for retrieving abstract and original image data.

2. Description of the Related Art

To cope with the large volume of documents generated in modern offices and factories, a data processing apparatus for electronically filing documents containing literal and drawing information has been developed, and is referred to as an electronic filing apparatus. A document inserted into such a filing apparatus, is optically scanned in a two-dimensional manner, and the image data obtained thereby are stored in a large-capacity memory device such as an optical disk. When a copy of a specific document is needed at a later time, the data thereof is retrieved from storage. This type of apparatus is disclosed in U.S. Pat. No. 4,661,988, for example.

The recent trend is that a plurality of image data filing apparatuses are connected, thus forming a so-called local area network (LAN), so that data can be retrieved from one apparatus and stored into another apparatus. The other recent trend is that the image data filing apparatuses file documents of greater sizes than before. This is because, now data is printed not only on A3-size paper, A4-size paper, B4-size paper, which are generally used in offices, but also on paper of greater sizes, such as A1-size paper and A2-size paper.

Here arises a problem with a stand-alone filing apparatus. The greater the document size, the longer time is required to retrieve the document from the filing apparatus. In particular, it takes an extremely long time to retrieve data equivalent to a A1-size or A2-size document from the filing apparatus.

More specifically, the image data printed at the density of 200 ppi (8 lines/mm) on an A4-size document is represented by 500 KB. This data can be compressed or reduced to about 50 KB by means of MR (modified read) technique. On the other hand, the image data printed at the density of 400 ppi (16 lines/mm) on an A1-size document is represented by 16 MB. This large amount of data can be compressed or reduced to about 1.6 MB, about 30 times greater than the compressed A4-size image data. A stand-alone data filing apparatus needs about 0.5 seconds to retrieve A4-size image data (200 ppi), and about 15 seconds to retrieve A1-size image data (400 ppi). In addition, it takes about 10 seconds to transfer the A4-size image data, and about 300 seconds to transfer A1-size image data, from one stand-alone data filing apparatus to another.

In short, the greater the image data, the longer the time required to retrieve the data from a stand-alone data filing apparatus and transfer it to another stand-alone data filing apparatus. Neither the data-retrieving time nor the data-transferring time can be shortened even if the CODEC circuit for compressing data and the data-transfer system are improved.

Here, the stand-alone filing apparatus cannot work so efficiently or so economical as is now demanded, due to the long time required to retrieve data and transfer the data to another stand-alone filing apparatus. Further, the present technology is unable to provide a data filing apparatus which can retrieve image data, one A1-size (or A2-size) document after another.

SUMMARY OF THE INVENTION

Accordingly, an object of this invention is to provide a data processing apparatus which can retrieve large documents at a relatively high speed, and may make an easy management of image data.

According to an aspect of this invention, there is provided an image information filing apparatus comprising first inputting means for inputting an original image, first memory means for temporarily storing the original image input by the first inputting means, means for extracting an abstract image from the original image stored in the first memory means, second inputting means for inputting a retrieval data corresponding to both the original image and the abstract image, second memory means for storing the original image stored in the first memory means, the abstract image, associated with the original image, extracted by the extracting means and the retrieval data input by the second inputting means, means for designating the retrieval data, and means for retrieving the abstract image corresponding to the retrieval data designated by the designating means from the second memory means.

BRIEF DESCRIPTION OF THE DRAWINGS

The aforementioned aspects and other features of the present invention are explained in the following description, taken in connection with the accompanying drawings, wherein:

FIG. 1 is a schematic block diagram of a LAN to which a data processing apparatus according to this invention is incorporated;

FIG. 2 is a block diagram of a center in the LAN of FIG. 1;

FIG. 3 shows a document management table stored, which is used for the data processing apparatus according to this invention;

FIG. 5 is a diagram showing a document management system used by the data processing apparatus according to this invention;

FIGS. 7 and 8 show examples of displays of retrieval codes when image data is registered;

FIGS. 9A and 9B are comparative diagrams of an original image and its abstract image, respectively;

FIG. 12 shows an example of a display of the retrieval code in a retrieval mode;

FIGS. 13A and 13B are document management tables stored in a magnetic disk, which is useful in explaining first and second document management systems employed by second embodiment of this invention;

DETAILED DESCRIPTION OF THE PREFERRED EMBODIMENTS

Figure 4:
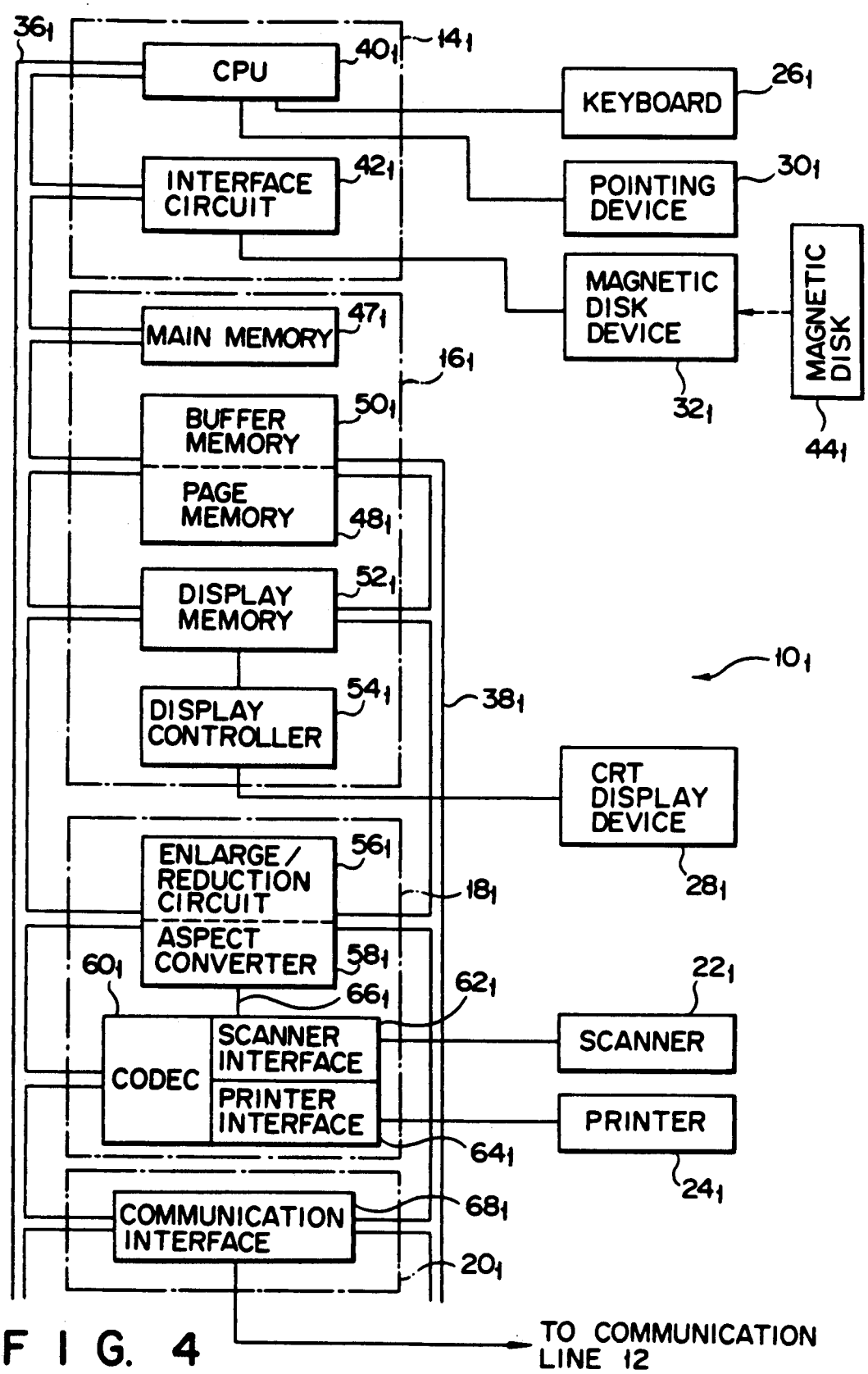
FIG. 4 is a block diagram of one of the terminal devices used in the LAN of FIG. 1.

A preferred embodiment of a data processing apparatus according to this invention will now be described, with reference to the accompanying drawings.

In the description to follow, a data processing apparatus according to this invention is applied to image data filing apparatus which are further incorporated into a LAN (local area network).

A typical LAN system is illustrated in FIG. 1. As shown, the LAN system is comprised of center 10, and terminal devices $10_1$, $10_2$, ..., communication line 12 interconnects these terminal devices $10_1$, $10_2$, ... with center 10.

A configuration of center 10 is illustrated in FIG. 2. As shown, center 10 is internally made up of control module 14, memory module 16, image processor module 18, and communication control module 20. Center 10 further includes external devices, such as two-dimensional scanning device, or scanner 22, printer 24, keyboard 26, CRT display device 28, magnetic disk device 32, and optical disk device 34. Center 10 additionally uses system bus 36 and image bus 38.

Control module 14 is made up of CPU (central processing unit) 40 for executing various controls of the filing apparatus, and interface circuit 42 providing an interface between CPU 40 in control module 14, and its related external devices such as magnetic disk device 32 and optical disk device 34. CPU 40 is coupled with keyboard 26 and pointing device 30, called a mouse. In use, magnetic disk 44 is set to magnetic disk device 32, and optical disk 46 is set to optical disk device 34.

One of the functions of CPU 40 is to make retrieval and registration of image data in response to commands coming through communication control module 20 and communication line 12 from terminal devices $10_1$, $10_2$, ..., in an on-line manner. In a retrieval mode, any of terminal devices $10_1$, $10_2$, ... generates an inquiry command or a retrieval command for detecting whether or not the center 10 includes a document based on a predetermined code, for example, the retrieval code. The retrieval code is transmitted to center 10, through communication line 12 and communication control module 20. The CPU 40 in center 10 responds to this, and searches for the document, and if it is present, returns a signal representing that the retrieved document is present and the image data of the retrieved document as well, to the terminal devices $10_1$, $10_2$, ... which issued that command. If the document is not present, CPU 40 returns a signal representing that the document is not present, to the external device. In a registration mode, CPU 40 receives the image data to be retrieved and a retrieval code associated with it.

Memory module 16 includes main memory 47 storing a control program of CPU 40, and page memory 48 serving as image memory with a memory capacity able to store the image data amounting to several pages of A4 size documents. Buffer memory 50 partially occupies page memory 48. A counter (not shown) controls the read/write operation for this buffer memory 50. Memory module 16 further includes display memory 52 and display controller 54, both serving as an interface with CRT display device 28.

Image processor module 18 includes enlarge/reduction circuit 56 for executing a processing to enlarge and reduce a displayed image, and aspect converter 58 for converting the coordinates of image data. This module 18 further includes compressor/expander (CODEC) 60 for compressing image data to reduce a redundancy of the image data and for expanding the same to restore the compressed image data to the original one. Scanner interface 62 for scanner 22, and printer interface 64 for printer 24 are also included in image processor module 18. Internal bus 66 further provided interconnects the above constituents components 56, 58, 60, 62, and 64 of image processor module 18.

Communication control module 20 includes a communication interface 68 mainly comprising a BCP (bus communication processor) connecting to a LAN, for example. Communication control module 20 may further include a UCP (universal communication processor) coupled with external devices such as FCP (facsimile communication processor) and personal computers, through interface devices such as RS-232C, GPIB, and SCSI.

Communication control module 20 is coupled with the communication control modules of external devices $10_1$, $10_2$, ..., through communication line 12. The module operates in various ways. When receiving an inquiry retrieval code from one terminal device, communication control module 20 sends the retrieved image data to the terminal device. Module 20 transfers the image data to be stored to page memory 48, and at the same time transfers its associated retrieval code to main memory 47.

System bus 36 as a bus for control signals interconnects control module 14, memory module 16, image processor module 18, and communication control module 20. Image bus 38 couples memory module 16 and image processor module 18.

Display memory 52 stores the image data which is actually displayed in a window or windows of CRT display device, viz., the image data after the image data in page memory 48 is subjected to appropriate processings such as enlargement, reduction, rotation, insertion, and inversion.

Scanner 22 two dimensionally scans an original such as a document by a laser beam, to pick up the information on the document, and converts them into electrical signals. The electrical signals are converted into image data containing the information. The image data is stored into an optical recording media such as optical disk 46, which is set to optical disk device 34.

Printer 24 prints out in the form of hard copy the image data, such as the image data as collected by scanner 22, the image data read out from optical disk 46 with the aid of optical disk device 34, and the image data being displayed by CRT display device 28, into a hard copy.

Keyboard 26 are used to enter, for example, retrieval codes proper to the image data to be stored into optical disk 46, and various types of operation commands.

CRT display device 28 as one of the output devices uses a cathode ray tube as a visual presenting means. CRT display device 28 displays the image data from scanner 22, the image data read out by magnetic disk device 32, and image data as read out by optical disk device 34. Further, CRT display device 28 is capable of displaying the entire documents by means of a maximum of four display windows. For example, four documents can concurrently be displayed, while those being arrayed vertically. Various editing works, such as enlargement, reduction, rotation, and scroll, may be conducted in each window independently of other windows.

Mouse 30 is a pointing device. Device 30 is used to selectively point out a desired item of edition on the display screen by moving vertically and/or horizontally a cursor on the screen. The edition items are displayed in fixed locations on the display screen, and includes various modes, edited image, range of cutting and merging of images, icon, and the like.

Magnetic disk device 32 is a hard disk device into which a magnetic disk 44 may be set. Magnetic disk 44 stores various types of control programs, and the retrieval data (image management data) including retrieval codes entered from keyboard 26, the address and size of each image data with a retrieval code in optical disk 46. The addresses used are logic addresses, and therefore when accessed, the physical track address and physical sector address in the optical disk is calculated for each address.

A retrieval code of the retrieval data comprises a plurality of symbols as entered by different keys. Each page of the document associated with the retrieval code contains many types of document management data, such as image number, document number, page number, document size (image size), compression method, resolution, block length, and logic address of image data in optical disk, as shown in FIG. 3. These document control data groups make up a document management table. Page number "A" indicates an abstract image, which will be described later in detail, not the image specified by the page number.

In FIG. 3, an abstract image corresponding to a first page of each document is added to a top of each document in the document management table. However, it is also possible to add an abstract image to every page of each document. Assuming that document management data system with the unit data of page in the document table is a first management system, e.g., page 1, the management data for the abstract image (second management system) is systemized into the same management system as the first management system.

Terminal devices $10_1$, $10_2$, . . . each output a retrieval request signal and receives the image data to be stored therein, and are configured as shown in FIG. 4. A configuration of terminal device $10_1$ will be described by way of example.

As shown, terminal device $10_1$ is comprised of control module $14_1$, main module $16_1$, image processor module $18_1$, communication control module $20_1$, scanner $22_1$, printer $24_1$, keyboard $26_1$, CRT display device $28_1$, mouse $30_1$, magnetic disk device $32_1$, system bus $36_1$, and image bus $38_1$. Scanner $22_1$ and printer $24_1$ are optionally coupled with terminal device $10_1$.

Control module $14_1$ is made up of CPU $40_1$, interface circuit $42_1$. Memory module $16_1$ is made up of main memory $47_1$, page memory $48_1$ including buffer memory $50_1$, display memory $52_1$, and display controller $54_1$. Image processor module $18_1$ is made up of enlarge/reduction circuit $56_1$, aspect converter $58_1$, CODEC $60_1$, scanner interface $62_1$, printer interface $64_1$, and internal bus $66_1$. Communication control module $20_1$ mainly comprises communication interface $68_1$.

When an operator desires a document, for example, he enters a retrieval code by keyboard $26_1$. CPU $40_1$ receives the retrieval code and compares it with a corresponding retrieval code stored in magnetic disk $44_1$. When these codes are coincident with each other, CPU $40_1$ sends the retrieval code and an image request signal to center 10 via communication line 12. Magnetic disk $44_1$ stores a retrieval code entered by keyboard $26_1$, and image data read by scanner $22_1$. The image management data stored magnetic disk 44 of center 10 is also stored in this magnetic disk $44_1$, while having no logic address.

Communication control module $20_1$ transmits to center 10 an inquiry retrieval code, image data to be stored and the image data associated with the retrieval code. Communication control module $20_1$ receives the image data associated with the inquiry retrieval code coming from center 10, and transfers it to page memory $48_1$.

The circuit and system components other than the above mentioned ones are substantially the same as those of center 10. Hence, description of them will be omitted by merely applying suffix number "1" to their reference numerals.

How the image data is synthetically managed will be described referring to FIG. 5, from the viewpoint of the document management.

A document management system in this instance, illustrated in FIG. 5, includes four strata, cabinet C, binder B, document D, and page P. Cabinet C is made to correspond to one side of optical disk 46. Cabinet C may be defined by a maximum of eight binders B. Each binder B may contain a maximum of 30,000 documents D. A title is assigned to each document D. The structure of the title is defined each binder B. One document D is treated as a fundamental unit of a file. "Note" as an explanation for document may additionally be used to the document, in addition to the title. Document D has a maximum of 4095 pages P.

Description to follow is elaboration of the operation of the filing apparatuses incorporated in the LAN.

Figure 6:
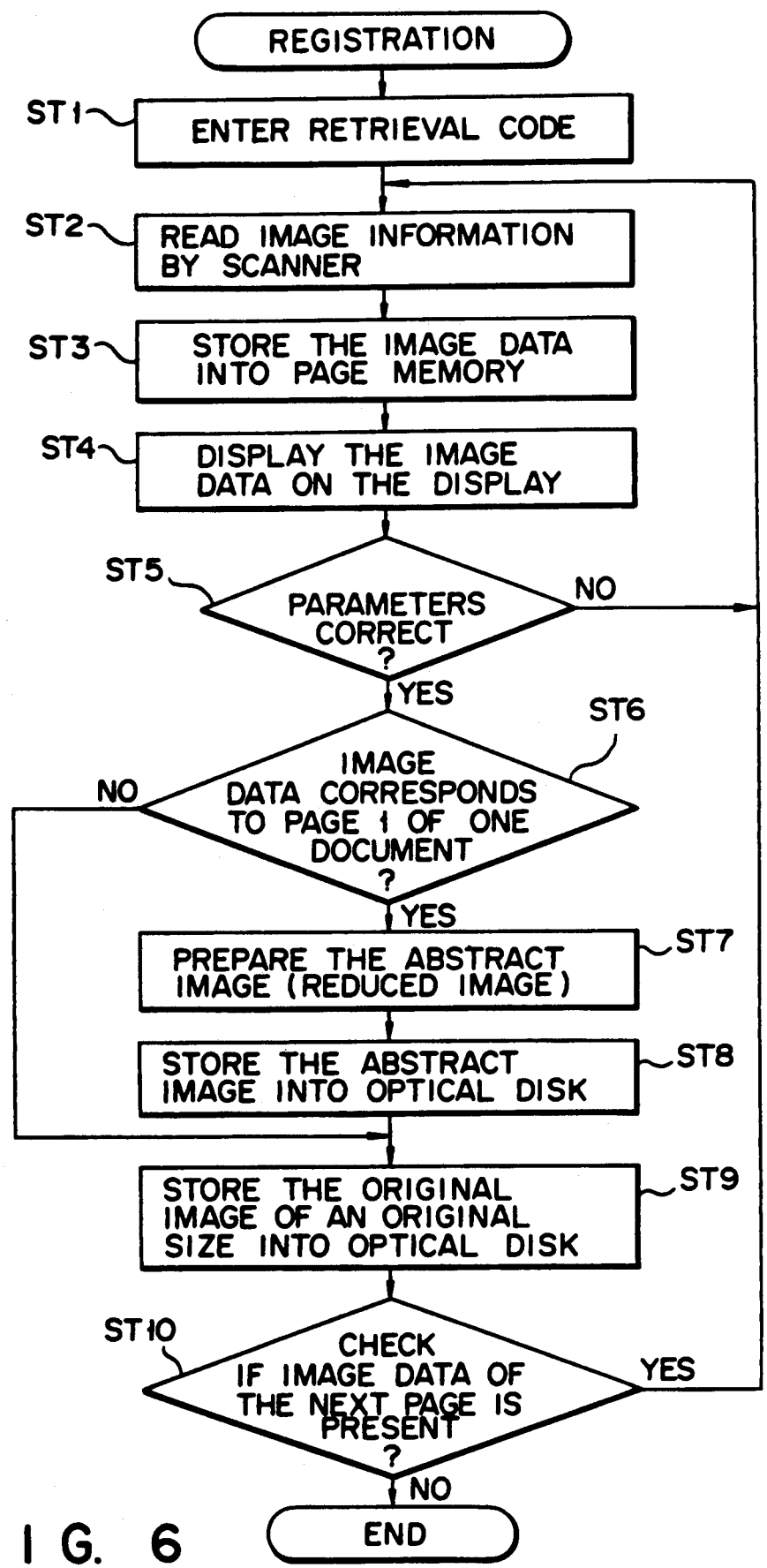
FIG. 6 is a flowchart showing a control flow.

How image data is registered or stored in center 10 will first be described. As shown in FIG. 6 showing a flow chart, an operator pushes a registration key on keyboard 26 to set up a registration mode in the center 10. Then, he enters a retrieval code for the image data to be registered (step ST1). The retrieval data of the retrieval code to be entered contains many items, for example, material number "12345", classification "Circuit Diagram", data "870829", type "Image File", and title "Abstract Image Retrieval System". When these codes are entered, CRT display device 28 displays a retrieval table 280 as specified by the retrieval code, as shown in FIG. 7.

CPU 40 checks whether the input data is correct or not by using digit number and the type of character, according to a predetermined retrieval code format for the retrieval code. CPU 40 checks the retrieval codes already stored so as to prevent the same retrieval codes from being doubly registered. If correct, the retrieval code is stored in main memory 47.

The operator sets original image O as shown in FIG. 9A to scanner 22. CPU 40 senses the original setting, and operates optical disk device 34 and scanner 22. Scanner 22 two dimensionally scans original image O, read the image data, and converts them into electrical signals (step ST2). The line data resulting from the electrical signals are sequentially stored into page memory 48 (step ST3). When the image data of one line has been stored into page memory 48, the image data is displayed on display memory 52. The image data is displayed on the display screen of CRT display device 28 under control of display controller 54 (step ST4).

The operator checks various parameters of image data displayed, such as skew, density, and resolution (step ST5). If the check result is no good, CPU 40 returns to step ST2. If it is good, the operator operates a store key (not shown) on keyboard 26. Then, CPU 40 checks if the registered image data is the page 1 of one document (step ST6). If the result is NO, CPU 40 advances to step ST9 to be given in detail later and stores the image data into optical disk 46. If the answer is YES, CPU 40 causes CODEC 60 to compress the image data of one unit stored in page memory 48 for each line data by a know method, for example, an MH (modified Huffman) method or an MR (modified READ) method. The band reduced line data is then stored into optical disk 46 by optical disk device 34. In this way, the image data supplied from scanner 22 is stored into optical disk 46 by optical disk device 34.

Upon completion of storing the image data, CPU 40 stores the document management data into main memory 47 in connection the retrieval code. The document management data contains a logic address as determined by physical track address and physical sector address (a memory location as specified by these physical addresses is storing image data), image length expressed in terms of the block length, resolution, compression method, document size, page number, and the like. CPU 40 reads out the retrieval data from main memory 47 and supplies it to magnetic memory device 32. The device 32 in turn stores the retrieval data into magnetic disk 44.

In step ST6, when the registered image data is the page 1 of one document, and has a large size of A2 or larger, for example, A1 or A2 size, CPU 40 prepares abstract (in this case, reduced) image of the image data of the large size and stores it into optical disk 46. This is done before the image data is registerd. When entering the retrieval code, an operator enters an item, "YES" representing that the abstract image exists. The item, as the 6th item in the retrieval data, is additionally listed in the multi-title number 6 in the retrieval table 280' (FIG. 8) that is displayed on the display by CRT display 28.

Figure 10:
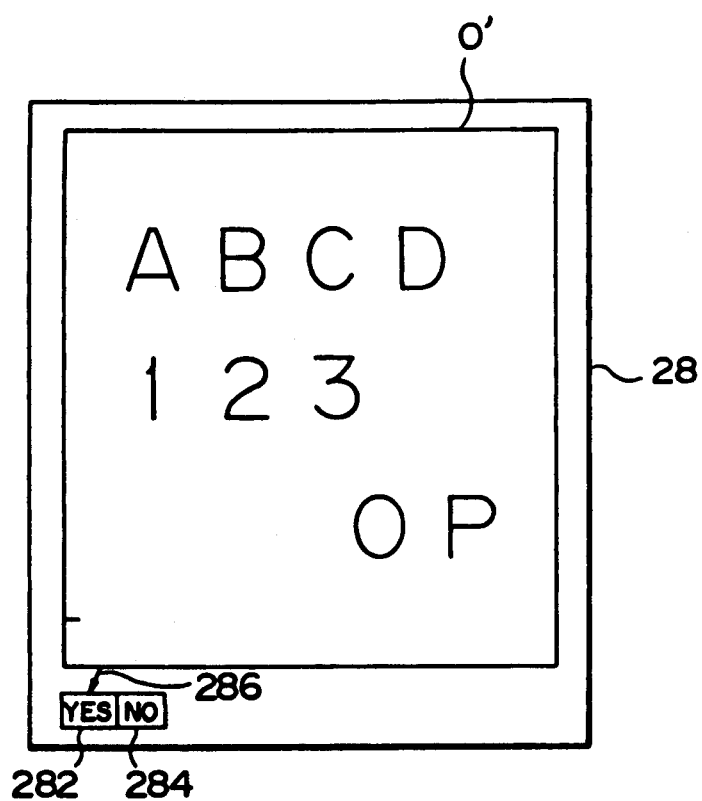
FIG. 10 is a diagram showing an original image being displayed as registration mode.

To be more specific, CRT display device 28 displays image O' corresponding to original image O, together with menu "YES" 282 and "NO" 284 for specifying or not specifying the abstract image, as shown in FIG. 10. When the abstract image must be specified, the operator points out "YES" by moving cursor 286 by means of pointing device 30. In response to the specification of "YES", CPU 40 reduces the image data of one unit stored in page memory 48 for each line data by means of enlarge/reduction circuit 56, for examples, the image data of A1 or A2 into the A4 image data. Then, it band compresses the compressed data in the MH method, for example by CODEC 60 (step ST7). The compressed line data is supplied to optical disk device 34. In turn, optical disk device 34 stores the supplied data into optical disk 46 (step ST8).

Following this, CPU 40 stores the original image with an original size into optical disk 46 (step ST9), and checks if the next page image is present or not (step ST10). If the next page is present, the CPU returns to step ST2, and executes the above sequence of operation steps. This is repeated until storage of the image data of necessary pages is completed.

Upon completion of the registration of the image data, CPU 40 stores, in association with the retrieval code, document management data includes the logic address of the stored image data as determined by the physical track address and physical sector address, image length determined by a block length, resolution, compression method, document size, page number, and the like, into main memory 47. CPU 40 supplies the retrieval data stored in main memory 47 to magnetic disk device 32. The disk device 32 stores the retrieval data from main memory 47 into magnetic disk 44.

If the first page of the document as specified by document number "000001" (see FIG. 3) represents a drawing, the image data of A1/400 ppi is reduced into that of A4/200 ppi, and the reduced image data is band compresses by CODEC 60. CPU 40 stores the abstract image data of A4/200 ppi as the reduced image data into the physical address of optical disk 46 corresponding to the logic address "100000". In this case, the data is attached with page number "A" (representing presence of the abstract image). The original image data of A1/400 ppi is band compressed and stored into the memory location of optical disk 46 as specified by the physical address corresponding to the logic address "100010".

As a result, the original image O as shown in FIG. 9A is stored into optical disk 46 in the form of the abstract image or reduced image $O_A$ as shown in FIG. 9B.

In this way, the image data by center 10 is registered.

Registration of the image data by terminal device $10_1$ will be described. No description of the same operations as those in center 10 will given, for simplicity.

An operator pushes a registration key on keyboard $26_1$ to set up a registration mode in terminal device $10_1$. Then, he enters a retrieval code for the image data to be registered. CPU $40_1$ executes the predetermined check and processing. The band compressed image data is supplied to magnetic disk $32_1$. CPU $40_1$ supplies also the retrieval code of main memory $47_1$ to magnetic disk device $32_1$. As a result, the band compressed image data and the retrieval code are stored into magnetic disk $44_1$.

At the end of the image data storing operation, CPU $40_1$ sends the image data of magnetic disk $44_1$ and the retrieval code to center 10, through communication control module $20_1$ and communication line 12. Center 10 receives the set of image data and retrieval code through communication control module 20, and stores the image data into page memory 48, and the retrieval code into main memory 46 under control of CPU 40. Then, CPU 40 supplies the image data of one unit stored in page memory 48 for each line data to optical disk device 34.

Also in this registration, when the registered image data is the first page of one document, and the image size is larger than A2 size or more, e.g., A1 or A2 size, the abstract image or reduced image data is sent to center 10 and stored into optical disk 46. This is done before the image data is sent to center 10 and registered in the optical memory 46.

Description to follow is how the image data thus registered is retrieved in center 10.

Figure 11:
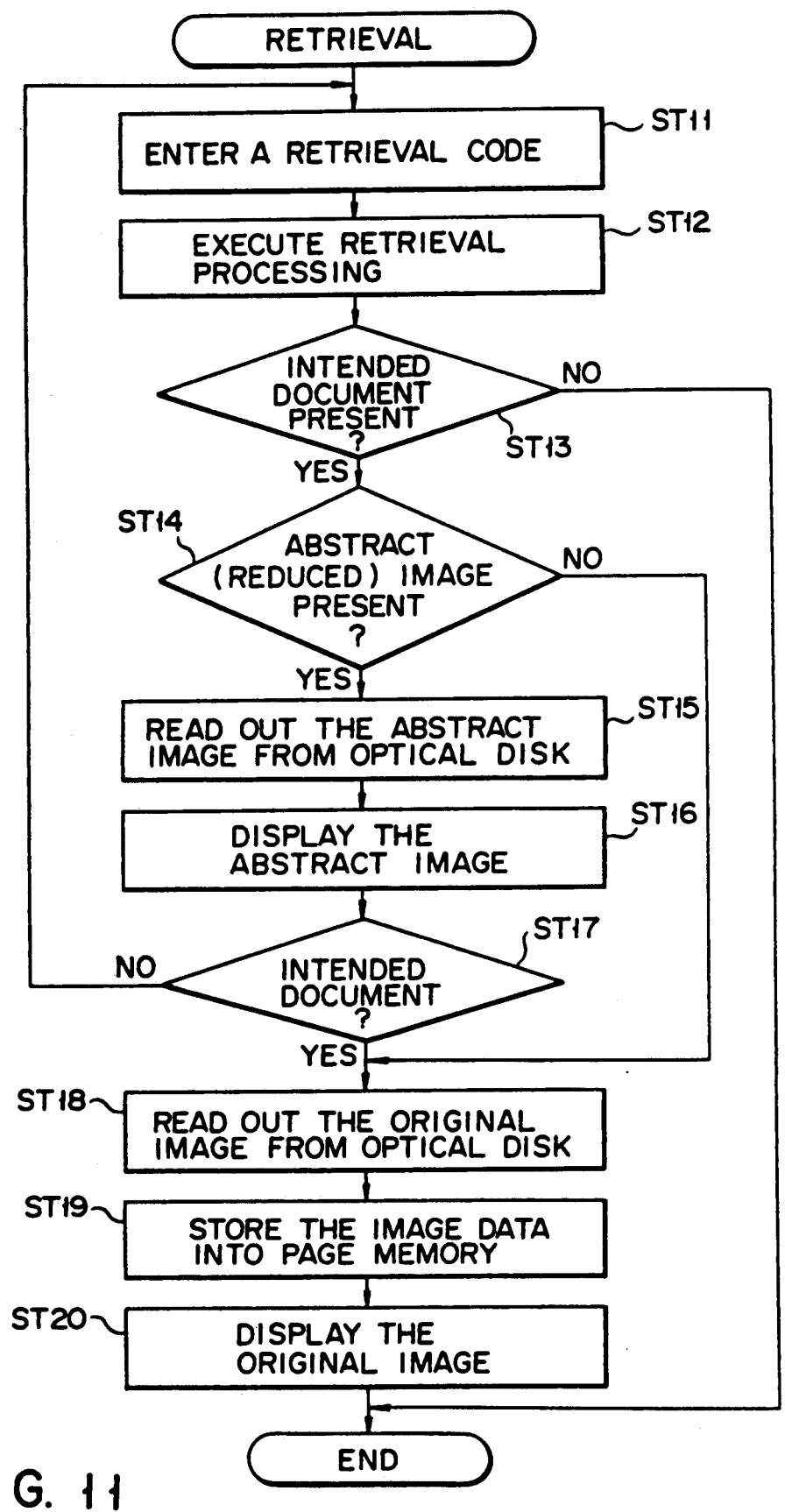
FIG. 11 is a flowchart for explaining the retrieval operation.

As shown in FIG. 11 showing a flowchart describing a control flow of such a retrieval, an operator operates a related key on keyboard 26, to set up a retrieval mode, and enters a predetermined retrieval code (step ST11). CPU 40 successively compares the entered retrieval code with those of magnetic disk 44 for its verification (step ST12), and will find out there is a coincidence between them or a retrieval code related to the entered one (step ST13). If the verification result is absent, CPU 40 stops the retrieval operation. If present, it stores the document number of the retrieval code into main memory 47.

At the end of the verification of step ST13, CPU 40 further causes CRT display device 28 to display table 288 a retrieval code (list of related titles of the coincident document) on the display, as shown in FIG. 12. At this time, CPU 40 checks if the document management data has symbol "A" representing presence of the abstract image, for each document number (step ST14). With progression of the check, display device 288 concurrently displays presence or absence of symbol "A" in table 288.

An operator points out desired items in table 288 by keyboard 26 or pointing device 30. Further, he checks if there is present or not the abstract data (as represented by page number "A") in a plurality of images within the document bearing the document number of the retrieval code.

If the abstract image is present, the logic address for the abstract image, for example, "100000" is read out (FIG. 3). This is done in step ST15. CPU 40 works out a physical track address and a physical sector address from the logic address read out, and cause optical disk device 34 to read out the data from the memory location on the track of optical disk 46 according to the physical addresses. CPU 40 fetches the image data (compressed data) supplied line by line from disk device 34, and supplies it to CODEC 60. CODEC 60 restores the reduced image data to the original image data by MH reverse conversion process. The restored image data is stored into page memory 48 under control CPU 40. After the image data of one page have been stored into page memory 48, under control of CPU 40, the image data (representing reduced image $O_A$ of A4 size in FIG. 9B) is displayed by the combination of display memory 52 and CRT display device 28 (step ST16).

The operator closely looks at the display bearing the abstract image data, and ascertains that it is the image under retrieval (step ST17), and requests CPU 40 to retrieve that image data by pressing a related key (not shown) on keyboard 26. Responsive to this, CPU 40 reads out the logic address "100010" associated with the image data of the first page abstract image data, from magnetic disk 44 (step ST18). Progressively, CPU 40 calculates the physical track address and the physical sector address as specified by the logic address, and causes optical disk device 34 to reproduce the image data from optical disk 46 according to these addresses. CPU 40 further fetches the compressed image data for each scanning line from optical disk device 34, and supplies the data to CODEC 60. CODEC 60 band expands the compressed image data to the original image data by the MH reverse conversion technique, and successively supplies the data to page memory 48. In this way, all the image data of one page are stored into page memory 48 (step ST19). At this time, CPU 40 causes CRT display device 28 to display the image data as the A4 size original image data O (see FIG. 9A) on the display screen (step ST20).

As described above, the image data of a large size representing, for example, drawings of A1 or A2 size are reduced to the abstract or reduced image data, e.g., the image data of A4 size. The abstract image data, together with the original image, are stored into optical disk 46. To retrieve a drawing, an operator enters a retrieval request command by keyboard 26. The filing apparatus first successively displays the abstract image data the way one turns over the leaves of a book, and continues this till the operator looks up the intended image data, and enters a stop command by a proper key. When looking it up, the operator requests the filing apparatus to retrieve the original image data corresponding to the abstract image data. In response to this, the apparatus reads it out from optical disk 46, and displays it on the display screen. If necessary, the operator applies necessary processings, for example, image editings, to the retrieved image data, and causes the filing apparatus to print out the retrieved image data in the form of a hard copy by printer 24. At this point, the drawing retrieval work ends.

Thus, to retrieve an original of large size requiring much transmission time, the filing apparatus, as installed in center 10 in this instance, takes two steps, to retrieve the image data of small data size called the abstract image data and to make the necessary image processing at the final stage. Therefore, this invention may provide a filing apparatus capable of retrieving the large original at a high speed.

Further, an operator may know presence or absence of the abstract image for each document when the retrieval code table is being displayed.

Retrieval of image data by terminal device $10_1$ will be described. Description will be given placing an emphasis on the different operations from those of center 10. An operator pushes a retrieval key (not shown) on keyboard $26_1$, to set up a retrieval mode in terminal device $10_1$, and enters a predetermined retrieval code. CPU $40_1$ stores the document number concerning the retrieval code coincident with or related to the entered retrieval code, into main memory $47_1$.

A given processing for displaying the retrieval code table by CRT display device $28_1$, is executed. An operator points out desired items in table 288 (FIG. 12) by keyboard 26 or pointing device 30. Further, he checks is there is present or not the abstract data (as represented by page number "A") in a plurality of images within the document bearing the document number of the retrieval code. If the abstract image is present, CPU $40_1$ transmits the selected document number and a command to retrieve the abstract image to center 10, by way of communication control module $20_1$ and communication line 12.

In center 10, CPU 40 responds to the retrieval command to read out the address of the abstract image of the document number, from magnetic disk 44. Subsequently, the necessary processing including image check is performed under control of CPU 40. After the image data of one page have been stored into page memory 48, under control of CPU 40, the image data (representing reduced image $O_A$ of A4 size in FIG. 9B) is transferred to terminal device $10_1$ through the related route. Receiving the image data, terminal device $10_1$ displays it by the combination of display memory $52_1$ and CRT display device $28_1$.

The operator ascertains that the abstract image data on CRT display device $28_1$ is the intended image data, and enters a command to request retrieval of that image data by a related key on keyboard $26_1$. CPU $40_1$ then transmits the command to center 10, through communication control module $20_1$ and communication line 12. In center 10 receiving the command, CPU 40 reads out the logic address "100010" specifying the image data in the first page of the abstract image data, from magnetic disk 44. As in the retrieval in center 10, the necessary processings in connection with magnetic disk 34 are performed, all the reproduced image data of one page is stored into page memory 48. CPU 40 sends that image data (the original image data O of A1 size in FIG. 7A) to terminal device $10_1$, via communication control module 20 and communication line 12. In terminal device $10_1$ after receiving the original image data, CRT display device $28_1$ displays the original image data on the screen with the aid of display memory $52_1$.

As described above, the image data of a large size representing, for example, drawings of A1 or A2 size, are reduced to the abstract or reduced image data, e.g., the image data of A4 size. The abstract image data, together with the original image, are stored into optical disk 46. When center 10 receives a retrieval request command from terminal device $10_1$, center 10 successively sends the abstract image data to terminal device $10_1$. In terminal device $10_1$, an operator repeats the sending of the retrieval request command until he looks up the intended image data. The display device $28_1$ successively displays abstract image data the way one turns over the leaves of a book, and continues this till the operator looks up the intended image data. When looking it up, the operator requests the filing apparatus to retrieve the original image data, which corresponds to the abstract image data. In response to this, the apparatus reads out it from optical disk 46, and sends the read out image data to terminal device $10_1$. Terminal device $10_1$ receives that image data, and if necessary, the operator edits the image data while displaying it on CRT display device $28_1$. Finally, he print outs the retrieved image data by printer $24_1$.

Thus, to retrieve an original of large size requiring much transmission time, the filing apparatus, as installed in the center in this instance, takes two steps, to retrieve the image data of small data size called the abstract image data and to make the necessary image processing at the final stage. Therefore, the filing apparatus installed as a terminal device is capable of retrieving the large original at a high speed, even through the communication line in a LAN. This results in reduction of the time the filing apparatuses in the center and terminal device occupy the communication line interconnecting them.

Furthermore, the presence or absence of an abstract image for each document may be known at a glance when a list of retrieval codas is displayed.

It is evident that the abstract image data may be prepared not only for the image data of A1 or A2 size, but also for any other large size image data or for a specific image data.

In the above-mentioned embodiment, the same document management system is used for both the abstract image and the image data of one page, or a set of image data. If necessary, different document management systems may be used for those different images, respectively. A specific example of this is to use the abstract image for each page of document.

Reference is made to FIGS. 13A and 13B. In FIG. 13A, there is shown a document management tables in magnetic disk 44 according to a first document management system. As shown, the management table contains image number, document number, page number, document size (image size), compression method, resolution, block length, logic address of image data in optical disk 46, presence (Yes) or absence (No) of abstract image, and abstract image number if the abstract image is present. This document management data is applied to the image data of one page as specified by the retrieval code for the retrieval data as entered in a predetermined sequence of retrieval keys.

In FIG. 13B, there is illustrated an abstract image control table expressed in terms of the second document management system, which is stored in magnetic disk 44. As shown, the management table comprises a set of the second document management data including contains abstract image number, document number, page number, document size (image size), compression method, resolution, block length, logic address of image data in optical disk 46. In this instance, the page number is "0" because the intended image is not present. The document size is "A4" representing a reduced document size. The data set of the second document management system is stored in magnetic disk 44 with relation to the data set of the first one. The abstract image is assigned to each document in the first document management system. Therefore, an operator may know the presence or absence of the abstract image for each page of a desired document.

The filing apparatus based on the second document management system has the same construction and operation as those of the filing apparatus based on the first document management system as referred to in the first embodiment. No further description of this will be given.

In the above embodiments, the image data of a A2 or larger size are directly size reduced and registered into the storage.

In the embodiments described above, the size of the image data, or the first page of a document, is reduced into an abstract image which is to be registered. The abstract image can be regarded as retrieve image data, rather than a reduced image. A repersentative one of the image data items forming the document is used as the retrieve image data. This abstract image data is registered as the first page of each document, on optical disk 34. Thus, the retrive image whose size is, for example, A4, is registered on the first page of each document, in the same way as images of larger sizes such as A1 and A2. To retrive the entire document from optical disk 34, the A4-sized abstract image, registered as the retrieval image data, is read out, whereby the data-retriving efficiency increases.

Furthermore, in case that the registered image is the first page of one document and has a large size, e.g., A1 or A2, a part of the image showing a feature of the image is stored into optical disk 46 before the original image registration. This partial image will be referred to as an abstract image, and is stored with the size of A4. Items showing the image features are, for example, drawing number, and document featuring items such as photograph, illustration, graph, and the like. A partial area of the image containing such image features is picked up and stored as an abstract image into the optical disk.

Figure 14A:
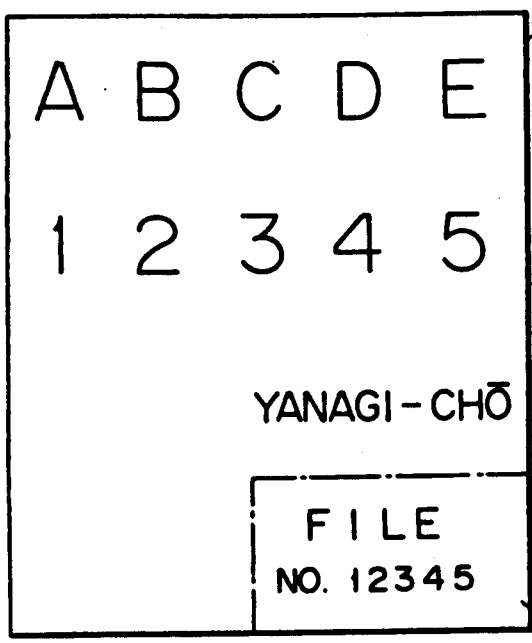
FIGS. 14A and 14B are diagrams useful in explaining a third embodiment of this invention, and show an original image and its abstract image formed from a designated region of the original image, respectively.

To be more specific, a partial area of A4 size denoted as L of A1-size original image $O_1$ in FIG. 14A includes a drawing number and hence it may be used as an abstract image. The area L is pointed out by mouse 30 or a related key or keys on keyboard 26. CPU 40 responds to the pointing out and reads in the image data in area L from page memory 48, and causes CODEC 60 to band compress the image data to abstract image data by the MH conversion technique, and supplies the band compressed image data to optical disk device 34. Then, optical disk device 34 stores the reduced image data into optical disk 46.

Following the storage of the abstract image, CPU 40 stores various parameters, such as image length, resolution, compression method, document size, and the like, into main memory 46, in connection with the retrieval code. The retrieval code is further stored into magnetic disk 44 by magnetic disk device 32.

To register for example, the A1 drawing that is contained in the page 1 of the document bearing document number "000001" (FIG., 3) and is expressed by image data of A1/400 ppi, the image data of the partial area L is first picked up, band compressed to the abstract image data of A4/400 ppi, and stored into the memory area on optical disk 46 as specified by a physical address resulting from the logic address "100000". The page number attached is "A".

Then, the original image data of A1/400 ppi is band compressed, and stored into a memory location on optical disk 46 as specified by the physical address based on the logic address "100010".

Figure 14B:
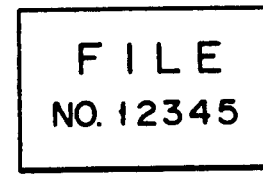

Thus, for registering the large drawing, its abstract image $O_2$ (FIG. 14B) representing the partial area L is stored before the original image $O_1$ (FIG. 14A).

In this embodiment, the display by the CRT display device, retrieval by that abstract image, registration/retrieval by terminal devices may be executed as in the embodiments already mentioned.

Figure 14C:
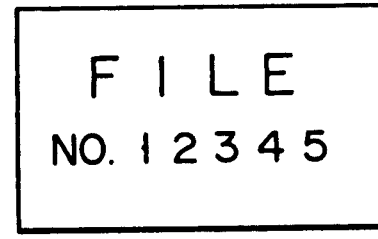
FIGS. 14C and 14D are diagrams of a modification of the third embodiment, and show an enlarged abstract image and a reduced abstract image respectively.
Figure 14D:

It is needless to say that the abstract image may be applied not only to the $A_1$ or $A_2$ size documents but also to any other size documents. Furthermore, it is possible to form the abstract image out of a designated area along. In such a case, a portion of the original image $O_1$ may be directly stored as the abstract image, as in the case of the second embodiment. Alternatively, the portion of the original image $O_1$ may be enlarged to form the abstract image $O_3$, as shown in FIG. 14C, or reduced to form the abstract image $O_4$, as shown in FIG. 14D, and the enlarged or reduced abstract image may be stored.

Figures 15A, 15B:
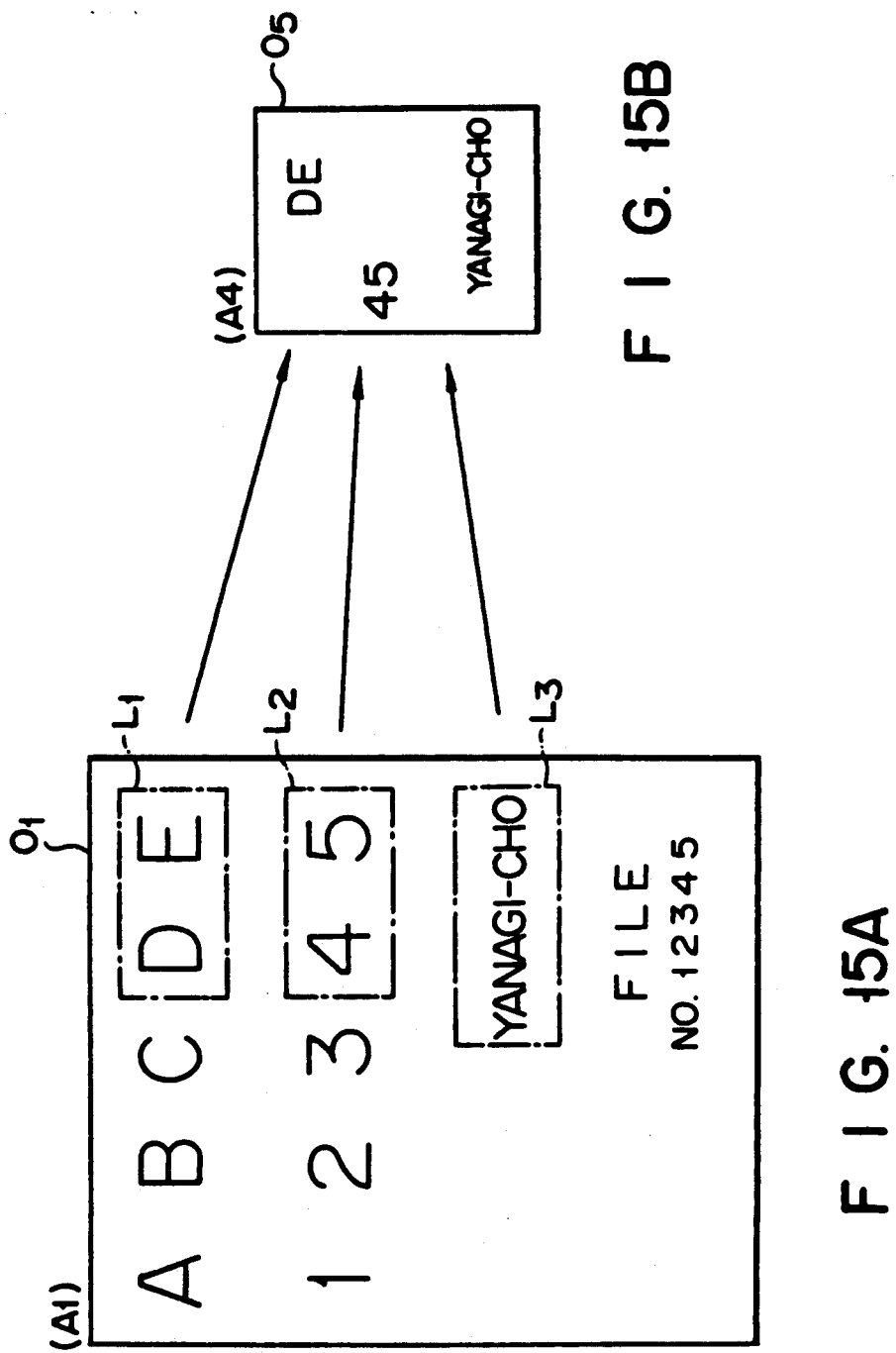
FIGS. 15A and 15B are diagrams of another modification of the third embodiment, and show an original image and an abstract image formed from a plurality of designation region of the original.

Another abstract image formation approach is illustrated in FIGS. 15A and 15B, in which a plurality of area $L_1$, $L_2$ and $L_3$ in the original image or image data $O_1$ are picked up to form an abstract image $O_5$ which indicates characteristic features of the original image $O_1$. In this case, the plurality of areas $L_1$ through $L_3$ within one page (one image) are designated, and the designated area are formed into an abstract image. This approach is very useful for filing newspaper. In filing newspaper, it is convenient for the operator when retrieval of stored data that each abstract image contains heading, photograph, data, and the like rather that it contains the entire news items in reduced size. The designation of the areas in the original image $O_1$ and the formation of the abstract image may be performed in a man-to-machine conversation by the operator. Alternatively, it is possible to fix needed areas. If the needed area are fixed, the automatic formation of abstract images may be possible. The features for the abstract image may be picked up from several pages of a document. This is very convenient for filing patent Gazettes, for example. In this case, patent number, title, claims and typical drawings are picked up from the Gazettes and are combined for the abstract image.

While the filing apparatus has been described with its application of the LAN system and the stand-array, it may be applied for any other picture communication system such as a facsimile communication, which is of the low speed type. In this case, when a center facsimile receives a retrieval request signal from one of local a facsimiles. It searches the requested image from those stored, and sends it to the local facsimile. This case brings about an effective use of telephone line.

What is claimed is:

1. An image information filing apparatus comprising:
   input means for inputting an original image which includes data covering a plurality of pages;
   first memory means for temporarily storing the original image input by said input means;
   drafting means for drafting an abstract image, the abstract image being formed of a predetermined portion or a combination of predetermined portions of the original image;
   second memory means for storing the original image as stored in said first memory means and the abstract image drafted by said drafting means in association with the original image; and
   retrieve means for retrieving the abstract image, based on retrieval data corresponding to both the original image and the abstract image, from the second memory means and for retrieving the original image associated with the abstract image when the retrieved abstract image is designated by the retrieval data,
   in which said second memory means stores the abstract image as a first page of the original image.

2. An apparatus according the claim 1, in which said drafting means comprises size-changing means for changing the size of the original image stored in the first memory means, so as to extract the abstract image.

3. An apparatus according to claim 1, in which said drafting means comprises means for reducing a first page of the original image stored in the first memory means so as to extract the abstract image.

4. An apparatus according to claim 2, in which said size-changing means comprises means for reducing the size of the original image.

5. An apparatus according to claim 1, wherein said second memory means stores both the original image and the abstract image such that they are represented in one data managing table.

6. An image information filing apparatus comprising:
   input means for inputting an original image which includes data covering a plurality of pages;
   first memory means for temporarily storing the original image input by said input means;
   drafting means for drafting an abstract image, the abstract image being formed of a predetermined portion or a combination of predetermined portions of the original image;
   second memory means for storing the original image as stored in said first memory means and the abstract image drafted by said drafting means in association with the original image; and
   retrieve means for retrieving the abstract image, based on retrieval data corresponding to both the original image and the abstract image, from the second memory means and for retrieving the original image associated with the abstract image when the retrieved abstract image is designated by the retrieval data, wherein said second memory means stores the original image and the abstract image such that they are represented in a different data managing table.

7. An image information filing apparatus comprising:
   input means for inputting an original image which includes data covering a plurality of pages;

first memory means for temporarily storing the original image input by said input means;

drafting means for drafting an abstract image, the abstract image being formed of a predetermined portion or a combination of predetermined portions of the original image;

second memory means for storing the original image as stored in said first memory means and the abstract image drafted by said drafting means in association with the original image; and retrieve means for retrieving the abstract image, based on retrieval data corresponding to both the original image and the abstract image, from the second memory means and for retrieving the original image associated with the abstract image when the retrieved abstract image is designated by the retrieval data, in which said drafting means comprises means for specifying a desired portion of the original image, and means for combining the specified portions to draft the abstract image.

8. An apparatus according to claim 2, in which said size-changing means comprises means for enlarging the size of the original image stored in said first memory means.

9. An image information filing apparatus comprising:

input means for inputting an original image which includes data covering a plurality of pages;

first memory means for temporarily storing the original image input by said input means;

drafting means for drafting an abstract image, the abstract image being formed of a predetermined portion or a combination of predetermined portions of the original image;

second memory means for storing the original image as stored in said first memory means and the abstract image drafted by said drafting means in association with the original image; and retrieve means for retrieving the abstract image, based on retrieval data corresponding to both the original image and the abstract image, from the second memory means and for retrieving the original image associated with the abstract image when the retrieved abstract image is designated by the retrieval data, wherein said retrieve means comprises:

means for displaying a list of related titles of the original images relating to the retrieval data and an item of data representing whether or not the abstract image has been drafted from the original image;

means for indicating a desired item in the table; and means for displaying the abstract image of the original image which is pointed out by said indicating means.

10. An apparatus according the claim 6, in which said drafting means comprises size-changing means for changing the size of the original image stored in the first memory means, so as to extract the abstract image.

11. An apparatus according to claim 6, in which said drafting means comprises means for reducing a first page of the original image stored in the first memory means so as to extract the abstract image.

12. An apparatus according to claim 6, in which said size-changing means comprises means for reducing the size of the original image.

13. An apparatus according to claim 6, wherein said second memory means stores both the original image and the abstract image such that they are represented in one data managing table.

14. An apparatus according to claim 6, in which said size-changing means comprises means for enlarging the size of the original image stored in said first memory means.

15. An apparatus according the claim 7, in which said drafting means comprises size-changing means for changing the size of the original image stored in the first memory means, so as to extract the abstract image.

16. An apparatus according to claim 7, in which said drafting means comprises means for reducing a first page of the original image stored in the first memory means so as to extract the abstract image.

17. An apparatus according to claim 7, in which said size-changing means comprises means for reducing the size of the original image.

18. An apparatus according to claim 7, wherein said second memory means stores both the original image and the abstract image such that they are represented in one data managing table.

19. An apparatus according to claim 7, in which said size-changing means comprises means for enlarging the size of the original image stored in said first memory means.

20. An apparatus according the claim 9, in which said drafting means comprises size-changing means for changing the size of the original image stored in the first memory means, so as to extract the abstract image.

21. An apparatus according to claim 9, in which said drafting means comprises means for reducing a first page of the original image stored in the first memory means so as to extract the abstract image.

22. An apparatus according to claim 9, in which said size-changing means comprises means for reducing the size of the original image.

23. An apparatus according to claim 9, wherein said second memory means stores both the original image and the abstract image such that they are represented in one data managing table.

24. An apparatus according to claim 9, in which said size-changing means comprises means for enlarging the size of the original image stored in said first memory means.

* * * * *

UNITED STATES PATENT AND TRADEMARK OFFICE
CERTIFICATE OF CORRECTION

PATENT NO. : 5,010,581
DATED : April 23, 1991
INVENTOR(S) : Masayuki Kanno

It is certified that error appears in the above-identified patent and that said Letters Patent is hereby corrected as shown below:

Title Page:
Abstract, line 2, change "date" to --data--.

Abstract, line 10, after "display" change "on" to --by--.

Signed and Sealed this

Fourth Day of May, 1993

Attest:

MICHAEL K. KIRK

Attesting Officer     Acting Commissioner of Patents and Trademarks